(12) United States Patent
Lin

(10) Patent No.: US 11,572,964 B2
(45) Date of Patent: Feb. 7, 2023

(54) PNEUMATIC-HYDRAULIC TYPE CONTROL VALVE

(71) Applicant: J.D COMPONENTS CO., LTD., Shou Shui Hsiang (TW)

(72) Inventor: Yu-An Lin, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 0 days.

(21) Appl. No.: 17/574,196

(22) Filed: Jan. 12, 2022

(65) Prior Publication Data
US 2022/0235878 A1     Jul. 28, 2022

(30) Foreign Application Priority Data

Jan. 25, 2021   (TW) ................................ 110200926

(51) Int. Cl.
| | | |
|---|---|---|
| *F16K 31/46* | (2006.01) | |
| *F16K 1/32* | (2006.01) | |
| *B62J 1/08* | (2006.01) | |

(52) U.S. Cl.
CPC .............. *F16K 31/465* (2013.01); *F16K 1/32* (2013.01); *B62J 2001/085* (2013.01)

(58) Field of Classification Search
CPC ...... F16K 31/465; F16K 1/32; B62J 2001/085
See application file for complete search history.

(56) References Cited

U.S. PATENT DOCUMENTS

| 2012/0104809 A1* | 5/2012 | Hsu ............................. B62J 1/08 |
| | | 297/215.13 |
| 2014/0208933 A1* | 7/2014 | Kuo ........................ F16F 9/466 |
| | | 91/43 |
| 2017/0225734 A1* | 8/2017 | Shirai ......................... B62J 1/28 |
| 2019/0300085 A1* | 10/2019 | Shirai ................... H01L 41/0986 |
| 2019/0301497 A1* | 10/2019 | Jordan .................. F15B 15/227 |

FOREIGN PATENT DOCUMENTS

KR          10-0939140          1/2010

* cited by examiner

*Primary Examiner* — Patrick C Williams
(74) *Attorney, Agent, or Firm* — Muncy, Geissler, Olds & Lowe, P.C.

(57) ABSTRACT

A pneumatic-hydraulic type control valve includes a cable attached to a fixed base, a valve base disposed in the fixed base, and a valve stem disposed in the valve base and driven by the cable to be opened. First and second oil guiding holes of the valve base communicate with each other when the valve stem is opened, and the first and second oil guiding holes of the valve base do not communicate with each other when the valve stem is closed. Further, the valve stem has a first stressed portion for bearing a fluid closing force and a second stressed portion for bearing a fluid opening force. The outer diameter of the first stressed portion is larger than that of the second stressed portion. Thus, the present invention achieves effects of simplifying structure and accurate actuation without affecting the sealing effect.

7 Claims, 11 Drawing Sheets

PNEUMATIC-HYDRAULIC TYPE CONTROL VALVE

BACKGROUND OF THE INVENTION

1. Field of the Invention

The present invention relates to valves and more particularly, to a pneumatic-hydraulic type control valve that can be opened by a pull-down force.

2. Description of the Related Art

Korean Patent No. 10-0939140 discloses a lifting valve disposed between an upper chamber and a lower chamber. When a rider is not seated on a saddle, if the lifting valve is pulled by a metal wire operated by a control rod, a spring disposed above the lifting valve is compressed by the lifting valve, and the upper chamber is allowed to open. At this time, the fluid flows from the upper chamber to the lower chamber, such that the seat post will be raised. When the control rod is released, the lifting valve is driven by the return force of the spring to close the upper channel, such that the seat post will remain in the vertical height position at the instant the lifting valve closed. On the contrary, when the rider is seated on the saddle, if the lifting valve is opened by using the metal wire operated by the control rod, the fluid flows from the lower chamber to the upper chamber, such that the seat tube will be lowered. When the control rod is released, the lifting valve is driven by the return force of the spring to close the upper channel, such that the seat post will thus remain in the vertical position attained at the instant the lifting valve closed.

However, in the aforesaid prior art, since the lifting valve is disposed between the upper chamber and the lower chamber, the metal wire is penetrated through the upper chamber from top to bottom and connected with the lifting valve through its bottom end, and the top end of the metal wire is connected with the control rod after bypassing an idler wheel. In addition to provide a complex structure, the metal wire has a long stroke, so that a problem caused by inaccurate movement of the lifting valve may occur when the lifting valve is opened. Further, because the closing force of the lifting valve comes from the return force of the spring, the closing force of the lifting valve may be decreased if elastic fatigue occurs in the spring, causing a problem of insufficient sealing.

SUMMARY OF THE INVENTION

It is a primary objective of the present invention to provide a pneumatic-hydraulic type control valve, which can simplify structure to provide better sealing effect, and can be opened by using a pull-down way to reduce stroke and ensure accuracy of movement.

To attain the above objective, the pneumatic-hydraulic type control valve of the present invention comprises a fixed base, a valve base, a valve stem, and a cable. The valve base is disposed in the fixed base and has a valve hole, a first oil guiding hole radially communicating with the valve hole, and a second oil guiding hole radially communicating with the valve hole. The valve stem includes a stem body and a stem head connected with the stem body. The stem body is axially disposed in the valve hole of the valve base, and the outer surface of the stem body has a flange. The stem head is axially disposed in the fixed base and connected with the cable. When the valve stem is located at a close position, the first oil guiding hole of the valve base and the second oil guiding hole of the valve base are obstructed by the flange of the stem body so as not to communicate with each other. When the valve stem is located at an open position, the first oil guiding hole of the valve base and the second oil guiding hole of the valve base are not obstructed by the flange of the stem body so as to communicate with each other. The stem body has a first stressed portion at one end thereof away from the stem head for bearing a fluid closing force. The flange of the stem body forms a second stressed portion for bearing a fluid opening force. The outer diameter of the first stressed portion is larger than the outer diameter of the second stressed portion. The cable is attached to the fixed base and connected with the stem head of the valve stem, such that the cable can be driven by an external force to move the valve stem from the close position to the open position.

It can be understood from the above illustration that the pneumatic-hydraulic type control valve of the present invention utilizes the difference in the outer diameter between the first stressed portion and the second stressed portion to enable the fluid closing force to be slightly greater than the fluid opening force when the valve stem is closed, thereby ensuring the sealing effect of the valve stem. Further, the pneumatic-hydraulic type control valve of the present invention is opened by using the cable to pull directly the valve stem along the axial direction of the valve stem without changing direction of the cable, such that the valve stem can be decreased in stroke and ensured the movement of the valve stem can be ensured accuracy of movement. Further, the returning spring disclosed by the prior art can be omitted so as to achieve an effect of simplifying structure.

Preferably, the valve base includes a first base body mounted in the fixed base, a second base body mounted in the fixed base and having the first oil guiding hole and the second oil guiding hole, and an oil guiding ring disposed between the first base body and the second base body and having a third oil guiding hole communicating with the valve hole and the second oil guiding hole. As such, when the valve stem is located at the open position, the first oil guiding hole and the third oil guiding hole communicate with each other through the valve hole.

Preferably, the second base body includes a tubular portion having the first oil guiding hole, and an annular portion connected with the tubular portion and having the second oil guiding hole.

Preferably, the first base body has a first shoulder portion, and the second base body has a second shoulder portion abutted with the tubular portion and the annular portion. The valve base further includes a first sealing ring disposed between the first shoulder portion of the first base body and the oil guiding ring, and a second sealing ring disposed between the second shoulder portion of the second base body and the oil guiding ring. As such, the sealing effect is provided by the first sealing ring and the second sealing ring.

Preferably, the tubular portion of the second base body includes an end wall and a periphery wall. The periphery wall has the first oil guiding hole, and two ends of the periphery wall are connected with the end wall and the second shoulder portion respectively. The stem body of the valve stem further has an axial air channel. When the valve stem is located at the open position, an air chamber is formed by the first stressed portion of the stem body, the end wall, and the periphery wall. The air chamber communicates with the outsides through the axial air channel so as to prevent a negative pressure from being occurring in the air chamber when the valve stem is pulled by the cable.

Preferably, the first stressed portion of the stem body has an annular groove. A third sealing ring is inserted in the annular groove and abutted against an inner surface of the periphery wall of the tubular portion. On one hand, the oil and gas can be ensured to be separated, and on the other hand, the first stressed portion and the second stressed portion can be ensured to have different outer diameters.

Preferably, the stem body further has a first stem portion and a second stem portion. The outer diameter of the first stem portion is smaller than the outer diameter of the second stem portion. One end of the first stem portion is connected with the first stressed portion. The flange is located at a junction of the first stem portion and the second stem portion. The second stem portion is abutted against the first sealing ring.

Other advantages and features of the present invention will be fully understood by reference to the following specification in conjunction with the accompanying drawings, in which like reference signs denote like components of structure.

DETAILED DESCRIPTION OF THE INVENTION

Figure 1:
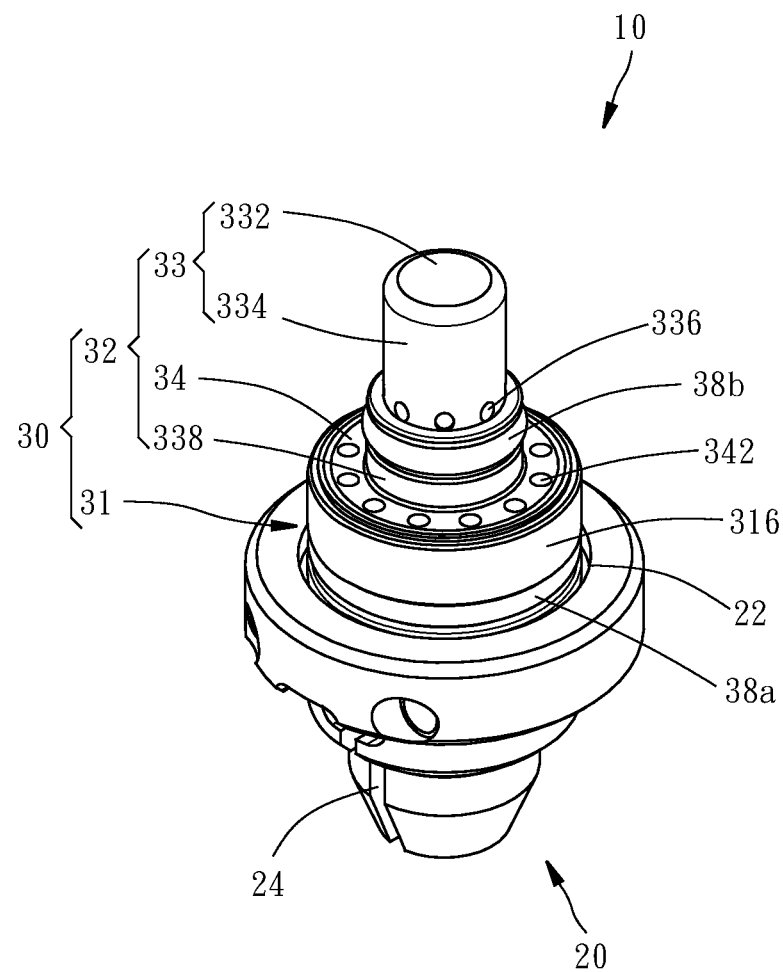
FIG. 1 is a perspective view of a pneumatic-hydraulic type control valve of the present invention.
Figure 2:
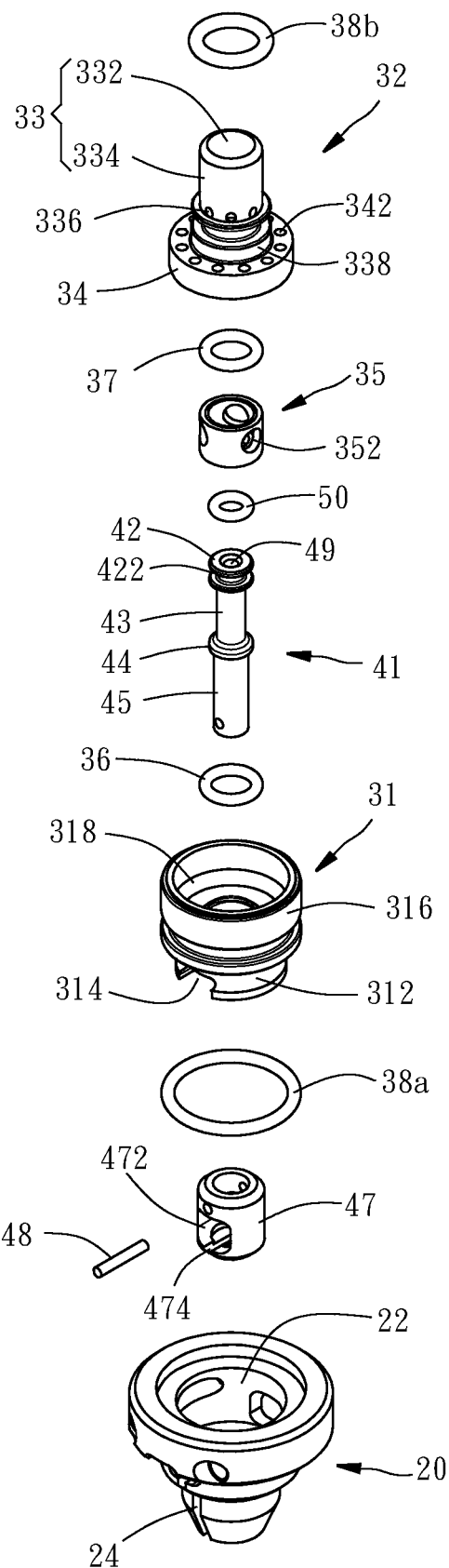
FIG. 2 is an exploded view of the pneumatic-hydraulic type control valve of the present invention.
Figure 3:
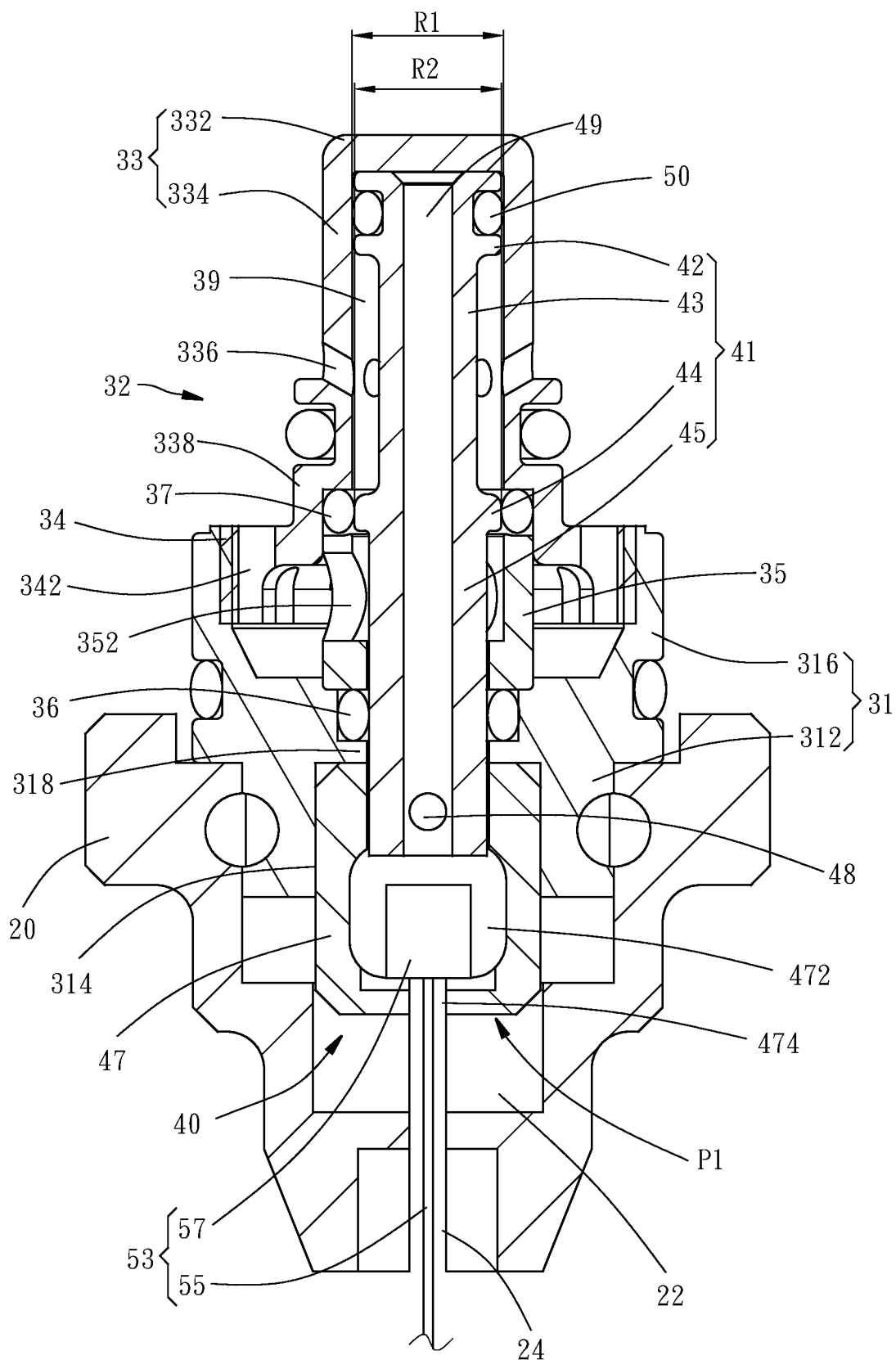
FIG. 3 is a sectional view of the pneumatic-hydraulic type control valve of the present invention, showing the valve stem is located at the close position.

Referring to FIGS. 1 to 3, a pneumatic-hydraulic type control valve 10 of the present invention comprises a fixed base 20, a valve base 30, a valve stem 40, and a cable 53.

The fixed base 20 has a first receiving chamber 22 opened upwards and a cable slot 24 communicating with the first receiving chamber 22.

As shown in FIGS. 2 and 3, the valve base 30 includes a first base body 31 and a second base body 32, and an oil guiding ring 35. The bottom portion 312 of the first base body 31 is disposed in the first receiving chamber 22 of the fixed base 20, and the bottom portion 312 of the first base body 31 has a second receiving chamber 314 opened downwards and communicating with the first receiving chamber 22 of the fixed base 20. The top portion 316 of the first base body 31 protrudes out of the first receiving chamber 22 of the fixed base 20. A sealing member 38a is sleeved on the top portion 316 of the first base body 31. The first base body 31 further has a first shoulder portion 318 located between the top portion 316 and the bottom portion 312. The second base body 32 includes a tubular portion 33 and an annular portion 34. The tubular portion 33 has an end wall 332 and a periphery wall 334. A sealing member 38b is sleeved on the outer surface of the periphery wall 334. The periphery wall 334 has a plurality of the first oil guiding holes 336 (the number is unlimited) arranged in an annularly spaced manner. The top end of the periphery wall 334 is connected with the end wall 332, and the bottom end of the periphery wall 334 is connected with the annular portion 34 though a second shoulder portion 338. The annular portion 34 of the second base body 32 is assembled with the top portion 316 of the first base body 31, and the annular portion 34 of the second base body 32 has a plurality of second oil guiding holes 342 (the number is unlimited) arranged in an annularly spaced manner. The oil guiding ring 35 is disposed between the first base body 31 and the second base body 32. The bottom end of the oil guiding ring 35 is abutted against a first sealing ring 36 abutted against the first shoulder portion 318 of the first base body 31, and the top end of the oil guiding ring 35 is abutted against a second sealing ring 37 abutted against the second shoulder portion 338 of the second base body 32. Further, the oil guiding ring 35 has a plurality of third oil guiding holes 352 constantly communicating with the second oil guiding holes 342. As such, a valve hole 39 is formed by the first base body 31, the second base body 32, the oil guiding ring 35, the first sealing ring 36, and the second sealing ring 37 inside the valve base 30. The valve hole 39 communicates radially with the first oil guiding holes 36, the second oil guiding holes 342, and the third guiding holes 352.

As shown in FIGS. 2 and 3, the valve stem 40 includes a stem body 41. The stem body 41 has a first stressed portion 42, a first stem portion 43 connected with the first stressed portion 42, a flange 44 connected with the first stem portion 43, and a second stem portion 45 connected with the flange 44 from top to bottom. The outer diameter of the first stem portion 43 is smaller than the outer diameter of the second stem portion 45. A second stressed portion is formed by the flange 44. The valve stem 40 further includes a stem head 47 assembled with the second stem portion 45 of the stem body 41 by using a pin 48. The stem head 47 has an engaging slot 472 and a notch 474 communicating with the engaging slot 472.

Figure 4:
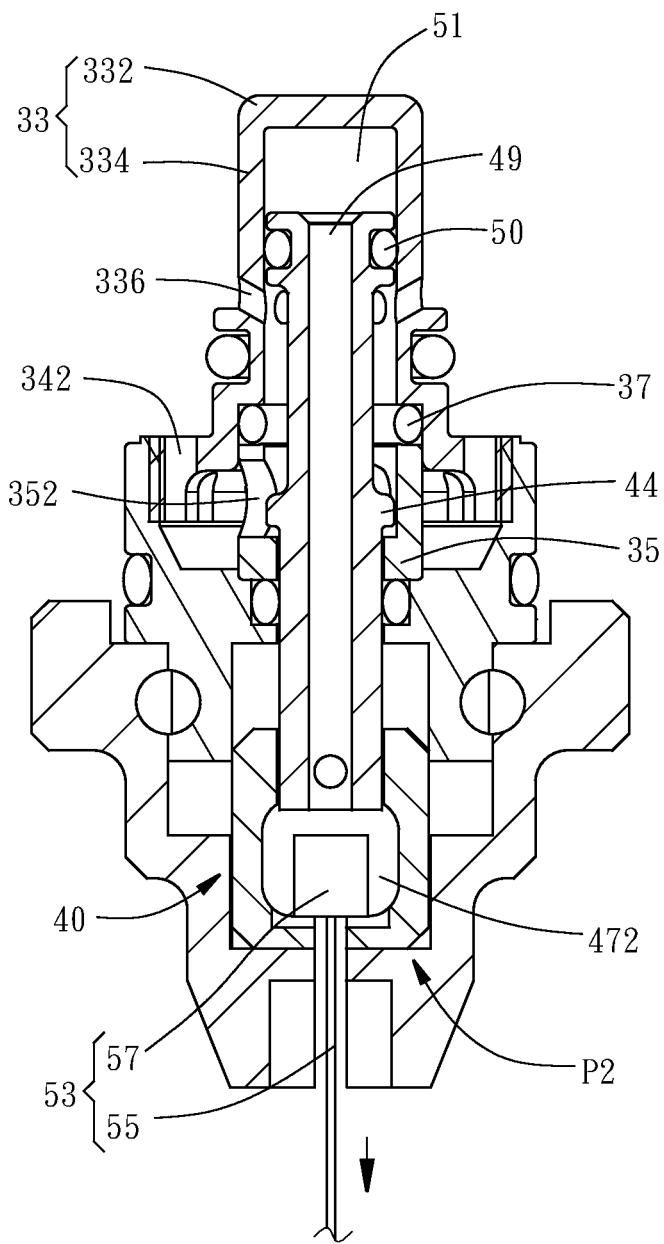
FIG. 4 is similar to FIG. 3, showing the valve stem is located at the open position.
Figure 7:
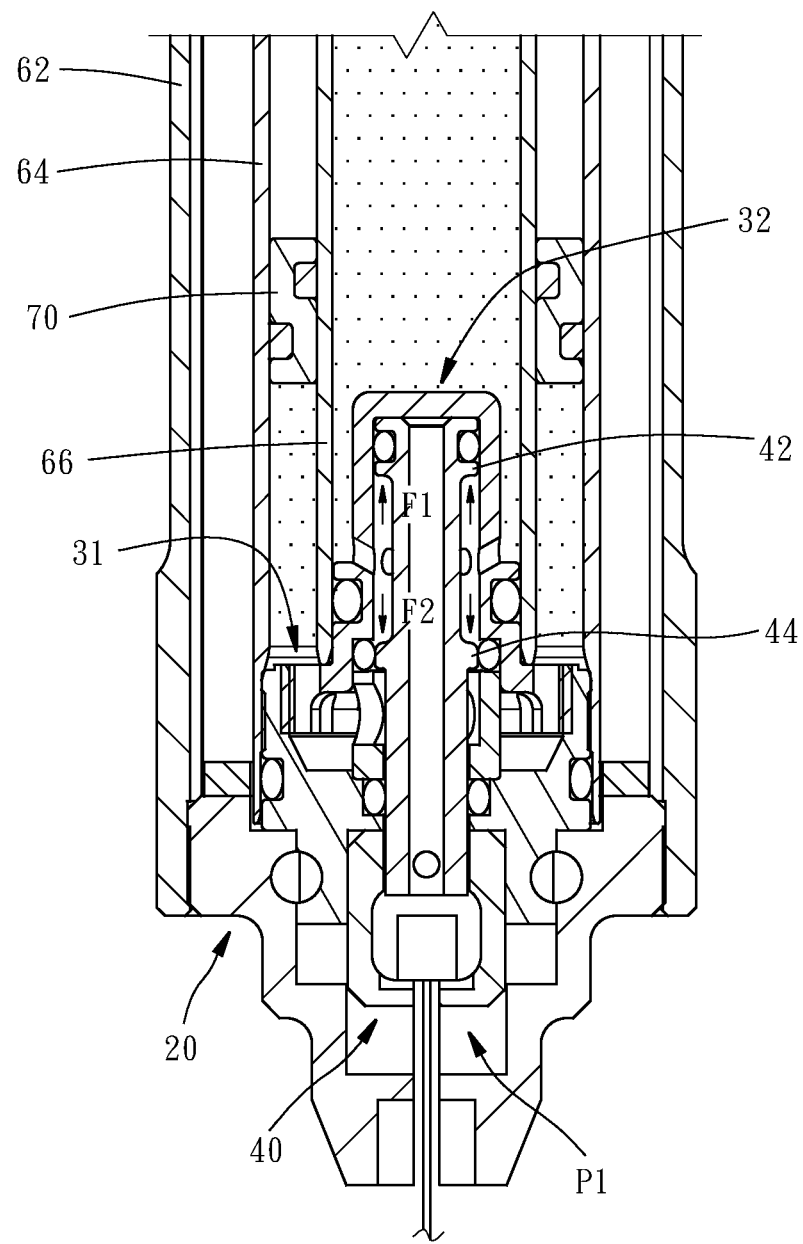
FIG. 7 is a partially enlarged view of FIG. 6, showing the valve stem is located at the close position.

As shown in FIG. 3, the stem body 41 is penetrated into the valve hole 39 of the valve base 30. The stem head 47 is disposed between the first receiving chamber 22 of the fixed base 20 and the second receiving chamber 314 of the first base body 31. After the valve stem 40 is assembled with the valve base 30, as shown in FIGS. 3 and 7, the first stressed portion 42 of the valve stem 40 is used for bearing a fluid closing force F1, and the second stressed portion (i.e., the flange 44) of the valve stem 40 is used for bearing a fluid opening force F2. As shown in FIGS. 2 and 4, the first stressed portion 42 of the valve stem 40 has an annular portion 422 inserted by a third sealing ring 50 abutted against an inner surface of the periphery wall 334 of the tubular portion 33. By means of the configuration of the third sealing ring 50, the oil and gas can be ensured to be separated, and the first stressed portion 42 and the second stressed portion (i.e., the flange 44) can be ensured to have different outer diameters. As such, because the outer diameter R1 of the first stressed portion 42 (i.e., the outer diameter of the third sealing ring 50) is greater than the outer diameter R2 of the second stressed portion (i.e., the outer diameter of the flange 44), the fluid closing force F1 acting on the valve stem 40 is slightly greater than the fluid opening force F2 acting on the valve stem 40.

The cable 53 can be, but not limited to, a derailleur cable used for a bicycle. As shown in FIG. 3, the cable 53 has a cable body 55 and a cable head 57. One end of the cable 53 is penetrated into the engaging slot 472 of the stem head 47 and connected with the cable head 57 through the cable slot 24 of the fixed base 20 and the notch 474 of the stem head 47, and the other end of the cable 53 is located outside the fixed base 20 and connected with a driving source (not shown and not limited to be manual or electric, such as a lever or motor), such that when the cable 53 is driven by the driving source, the valve stem 40 is driven by the cable 53 to move from a close position P1 as shown in FIG. 3 to an open position P2 as shown in FIG. 4. When the valve stem 40 is located at the close position P1 as shown in FIG. 3, the flange 44 of the valve stem 44 is abutted against the second sealing ring 37, such that the first oil guiding holes 336 and the second oil guiding holes 342 are obstructed by the flange 44 of the stem body 41, resulting in that the first oil guiding holes 336 and the second oil guiding holes 342 do not communicate with each other through the third holes 352. When the valve stem 40 is located at the open position P2 as shown in FIG. 4, the flange 44 of the stem body 41 and the second sealing ring 37 are staggered with each other, such that the first oil guiding holes 336 and the second oil guiding holes 342 are not obstructed by the flange 44 of the stem body 41, resulting in that the first oil guiding holes 336 and the second oil guiding holes 342 communicate with each other through the third holes 352.

Further, the valve stem 40 further includes an axial air channel 49. The bottom end of the axial air channel 49 communicates with the outsides through the engaging slot 472 of the stem head 47. When the valve stem 40 is located at the open position P2 as shown in FIG. 4, an air chamber 51 is formed by the first stressed portion 42 of the stem body 41, the end wall 332, and the periphery wall 334. The air chamber 51 communicates with the outsides through the axial air channel 49 for preventing a negative pressure from being occurring in the air chamber 51 when the valve stem 40 is pulled by the cable 53.

Figure 5:
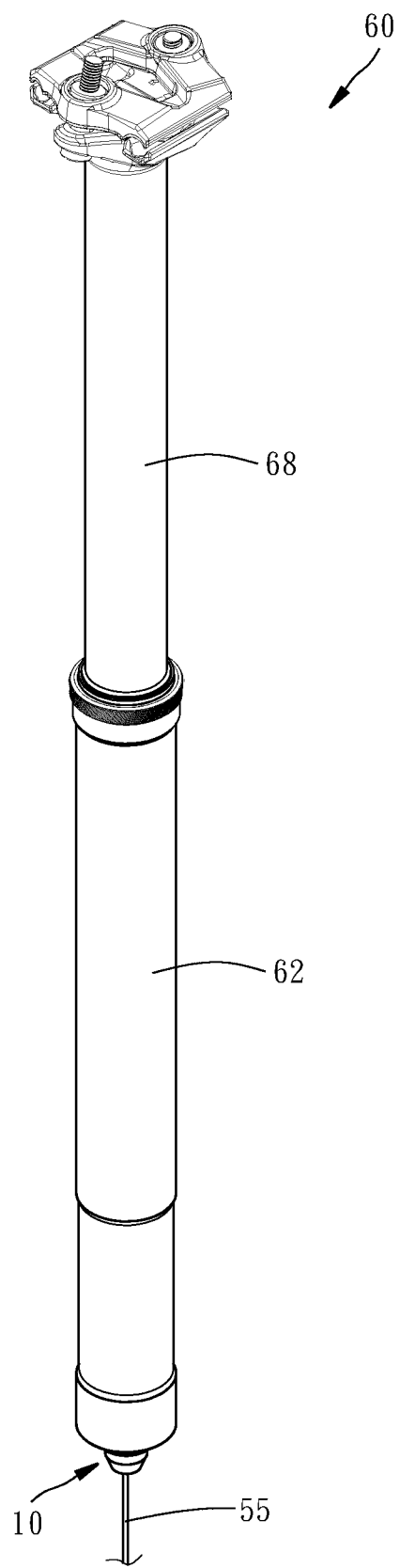
FIG. 5 is a perspective view of a lifting device using the pneumatic-hydraulic type control valve of the present invention.
Figure 6:
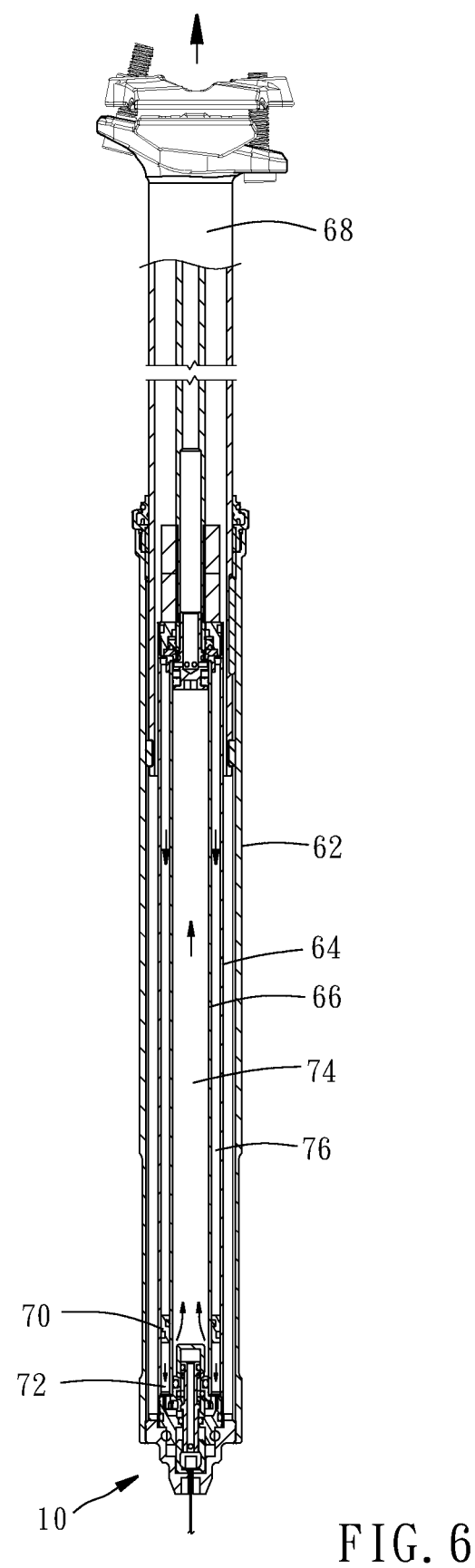
FIG. 6 is a partially sectional view of FIG. 5, showing the lifting tube is raised.

In actual application, the pneumatic-hydraulic type control valve 10 of the present invention is assembled with the bottom end of a lifting device 60 (by taking a lifting seat tube as an example in this embodiment, but not limited thereto). As shown in FIGS. 5 to 7, the fixed base 20 is fixed to the bottom end of an outer tube 62, and the first base body 31 is fixed to the bottom end of an outer oil tube 64, and the second base body 32 is fixed to the bottom end of an inner oil tube 66. Because the lifting device 60 is conventional and not the key point of the invention, the detailed configuration will not be repeatedly mentioned hereunder.

Figure 8:
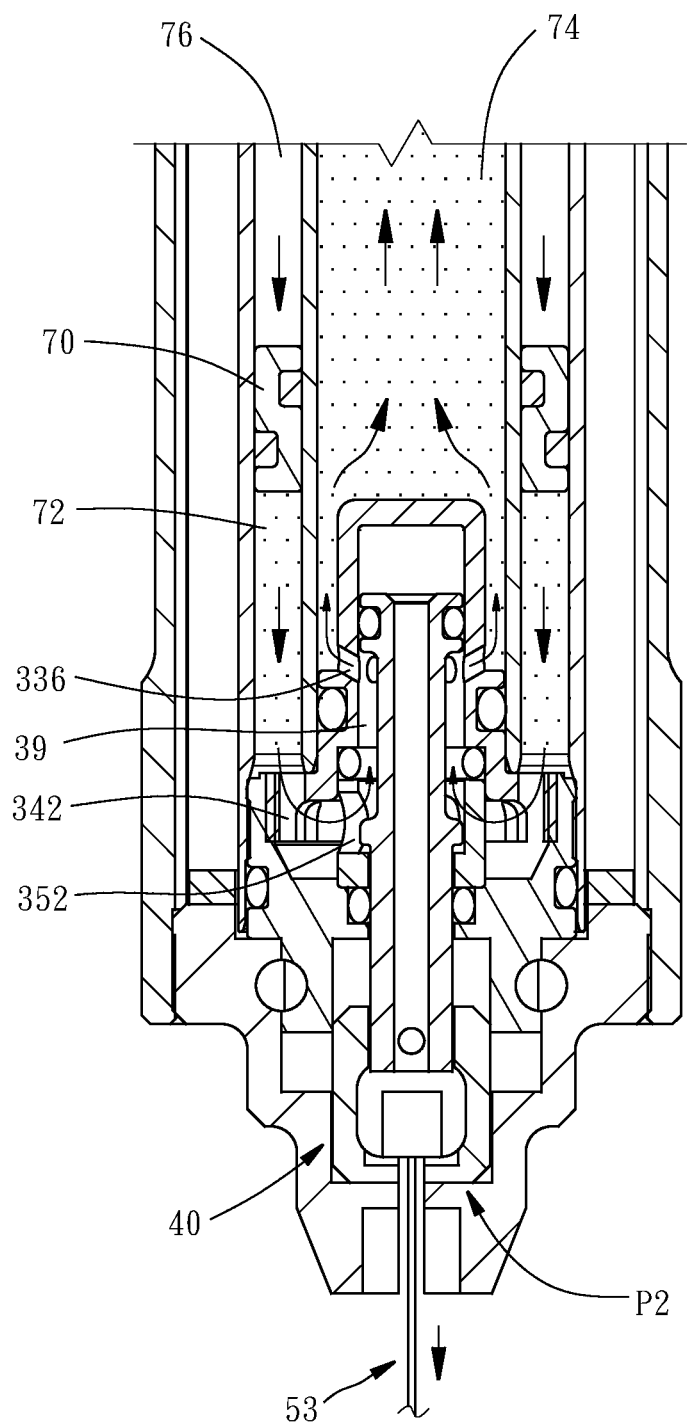
FIG. 8 is similar to FIG. 7, showing the valve stem is located at the open position.
Figure 9:
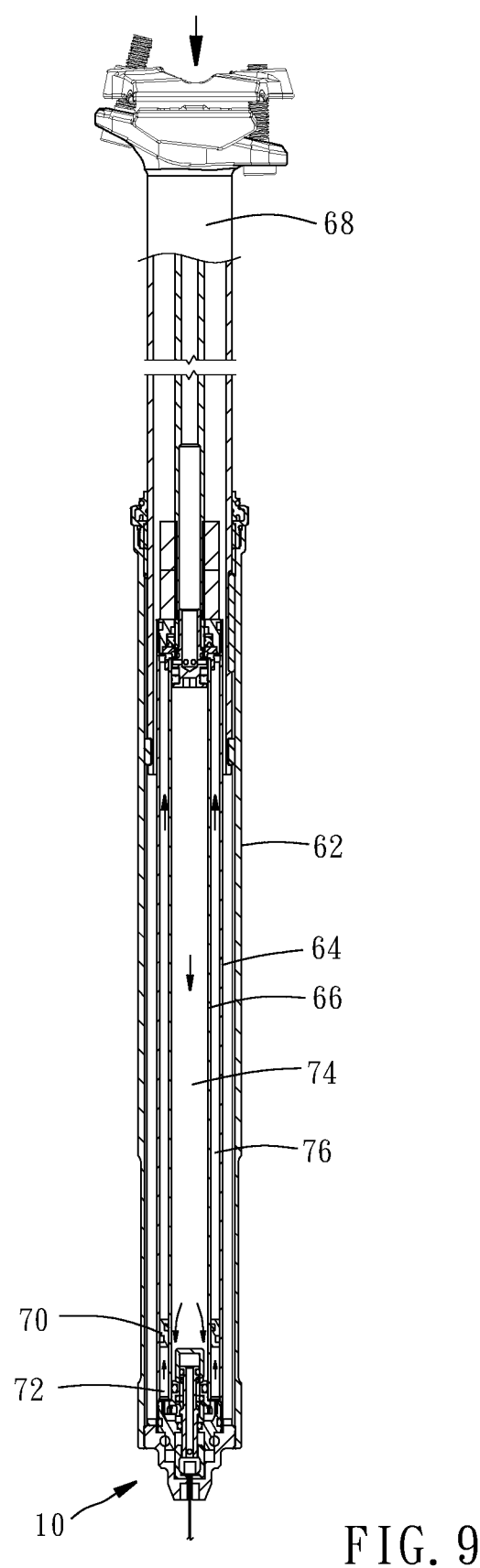
FIG. 9 is similar to FIG. 6, showing the lifting tube is lowered.

Since the fluid closing force F1 is slightly greater than the fluid opening force F2, the valve stem 40 is maintained in the close position P1 as shown in FIG. 7 when a rider is not seated on a saddle. When the valve stem 40 is pulled by the cable 53 to the open position P2 as shown in FIG. 8, the air in the air chamber 76 pushes a floating piston 70 downwards and then the floating piston 70 pushes the hydraulic oil in the outer oil chamber 72. Thereafter, the hydraulic oil flows from the outer oil chamber 72 to an inner oil chamber 74 through the second oil guiding holes 342, the third oil guiding holes 352, the valve hole 39, and the first oil guiding holes 336 in order. A seat post 68 will thus be raised (as shown in FIG. 6). Once the pulling force applied to the cable 53 is eliminated, the valve stem 40 is pushed by the fluid closing force F1 acting on the first stressed portion 42 to move back to the close position P1 as shown in FIG. 7, such that the seat post 68 stops raising.

Figure 10:
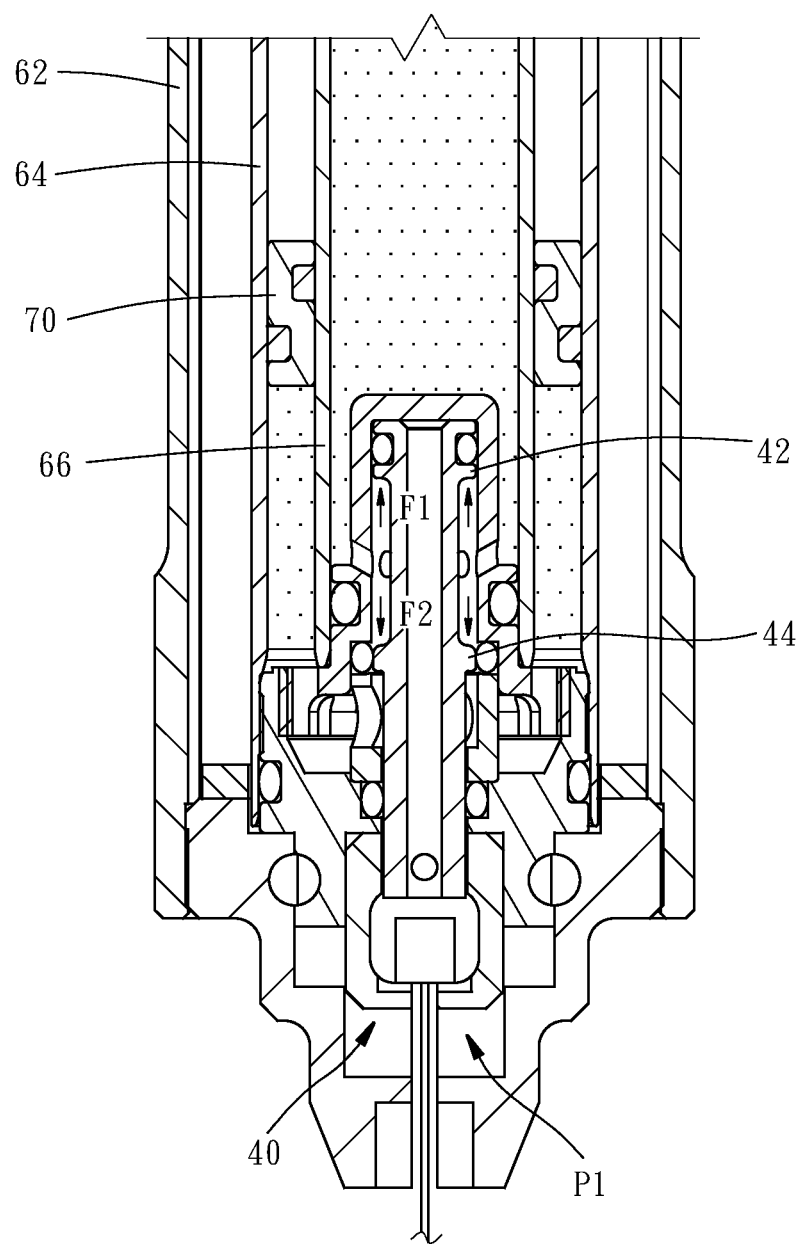
FIG. 10 is a partially enlarged view of FIG. 9, showing the valve stem is located at the close position.
Figure 11:
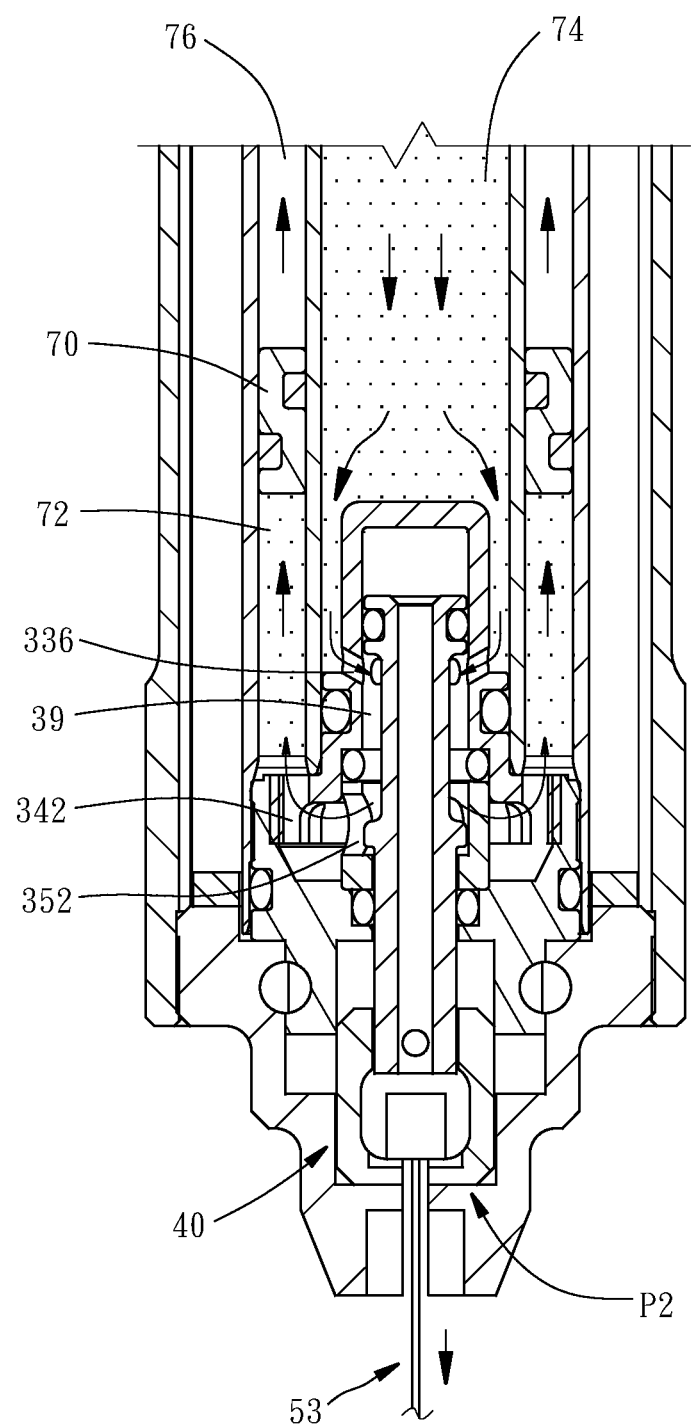
FIG. 11 is similar to FIG. 10, showing the valve stem is located at the open position.

When the rider is seated on the saddle, the fluid closing force F1 acting on the valve stem 40 is slightly increased. When the valve stem 40 is pulled by the cable 53 to the open position P2 as shown in FIG. 11, the hydraulic oil in the inner oil chamber 74 flows to the outer oil chamber 72 through the first oil guiding holes 336, the valve hole 39, the third oil guiding holes 352, and the second oil guiding holes 342 in order, and then the hydraulic oil pushes the floating piston 70 upwards to compress the air in the air chamber 76. The seat post 68 will thus be lowered. When the pulling force applied to the valve stem 40 is eliminated, the valve stem 40 is pushed by the fluid closing force F1 acting on the first stressed portion 42 to move back to the close position P1 as shown in FIG. 10, such that the seat post 68 stops lowering.

As indicated above, the pneumatic-hydraulic type control valve 10 of the present invention utilizes the difference in the outer diameter between the first stressed portion 42 and the second stressed portion (i.e., the flange 44) to enable the fluid closing force F1 to be slightly greater than the fluid opening force F2 when the valve stem 40 is closed, thereby ensuring the sealing effect of the valve stem 40. In addition, the pneumatic-hydraulic type control valve 10 of the present invention allows the valve stem 40 to be opened by directly pulling the cable 53 along the axial direction of the valve stem 40 without changing the direction of the cable 53, such that the valve stem 40 can be decreased in stroke and ensured accuracy of movement. Further, the returning spring disclosed by the prior art can be omitted so as to achieve an effect of simplifying structure.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A pneumatic-hydraulic type control valve comprising:
a fixed base;
a valve base disposed in the fixed base and having a valve hole, a first oil guiding hole radially communicating with the valve hole, and a second oil guiding hole radially communicating with the valve hole;
a valve stem including a stem body axially movably disposed in the valve hole of the valve base and having a flange at an outer surface thereof, and a stem head disposed between the fixed base and the valve base and axially moved between a close position where the first oil guiding hole of the valve base and the second oil guiding hole of the valve base are obstructed by the flange of the stem body, such that the first and second oil guiding holes do not communicate with each other, and an open position where the first oil guiding hole of the valve base and the second oil guiding hole of the valve base are not obstructed by the flange of the stem body, such that the first and second oil guiding holes communicate with each other, the stem body having a first stressed portion at one end thereof away from the stem head for bearing a fluid closing force, the flange of the stem body forming a second stressed portion for bearing a fluid opening force, an outer diameter of the first stressed portion being larger than an outer diameter of the second stressed portion; and a cable movably disposed in the fixed base upwards and downwards and connected with the stem head of the valve stem for driving the valve stem to move from the close position to the open position.

2. The pneumatic-hydraulic type control valve as claimed in claim 1, wherein the valve base includes a first base body mounted in the fixed base, a second base body mounted in the fixed base and having the first oil guiding hole and the second oil guiding hole, and an oil guiding ring disposed between the first base body and the second base body and having a third oil guiding hole communicating with the valve hole and the second oil guiding hole.

3. The pneumatic-hydraulic type control valve as claimed in claim 2, wherein the base body includes a tubular portion having the first oil guiding hole, and an annular portion connected with the tubular portion and having the second oil guiding hole.

4. The pneumatic-hydraulic type control valve as claimed in claim 3, wherein the first base body has a first shoulder portion, and the second base body has a second shoulder portion abutted with the tubular portion and the annular portion; the valve base further includes a first sealing ring disposed between the first shoulder portion of the first base body and the oil guiding ring, and a second sealing ring disposed between the second shoulder portion of the second base body and the oil guiding ring; the flange is abutted against the second sealing ring when the valve stem is located at the close position, and the flange is staggered with the second sealing ring when the valve stem is located at the open position.

5. The pneumatic-hydraulic type control valve as claimed in claim 4, wherein the tubular portion of the second base body includes an end wall and a periphery wall having the first oil guiding hole and provided with two ends connected with the end wall and the second shoulder portion respectively; the stem body of the valve stem further has an axial air channel, and an air chamber is formed by the first stressed portion of the stem body, the end wall of the tubular portion, and the periphery wall of the tubular portion when the valve stem is located at the open position; the air chamber communicates with the outside through the axial air channel.

6. The pneumatic-hydraulic type control valve as claimed in claim 5, wherein the first stressed portion of the stem body has an annular groove inserted by a third sealing ring abutted against an inner surface of the periphery wall of the tubular portion.

7. The pneumatic-hydraulic type control valve as claimed in claim 6, wherein the stem body further has a first stem portion provided with one end thereof connected with the first stressed portion, and a second stem portion abutted against the first sealing ring; an outer diameter of the first stem portion is smaller than an outer diameter of the second stem portion; the flange is located at a junction of the first stem portion and the second stem portion.

* * * * *